Oct. 11, 1927.
C. H. TOMLINSON
1,645,361
SPRING DRAFT GEAR
Filed May 13, 1925
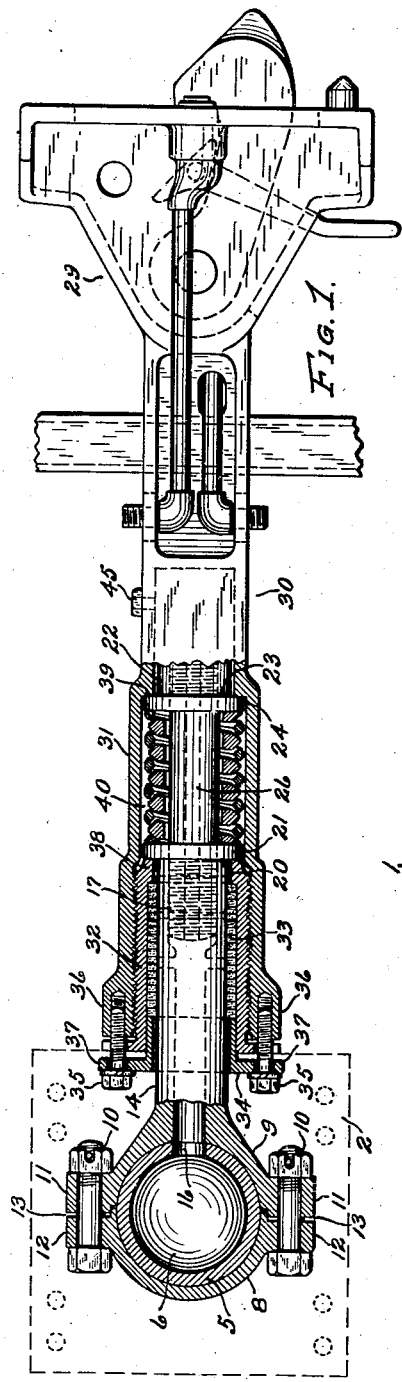
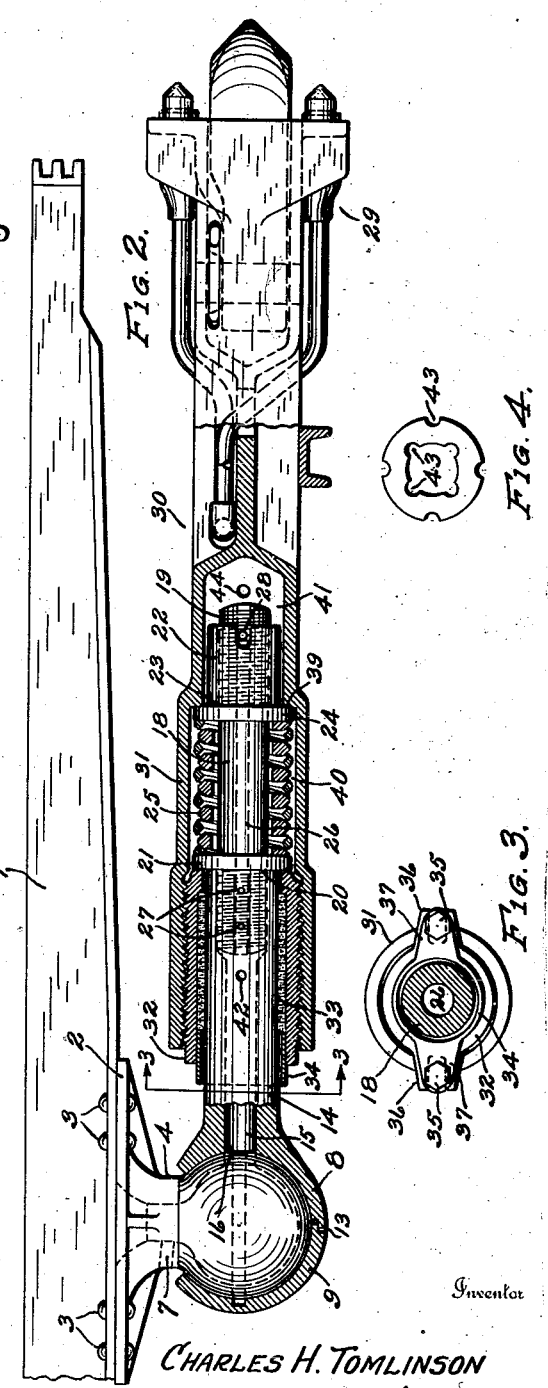
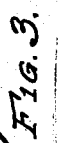
Inventor
CHARLES H. TOMLINSON
By
Attorney Patented Oct. 11, 1927.

1,645,361

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

SPRING DRAFT GEAR.

Application filed May 13, 1925. Serial No. 29,953.

My invention relates to a coupling mechanism for cars and has particular reference to the draft gear which is interposed between the coupler proper and the anchorage for securing the coupler to a car.

The object of my invention is to provide a spring draft gear in which a buffing spring is employed and to provide a construction in which the moving parts may be lubricated and in which the lubrication may be maintained.

It has been customary in the past to employ spring draft gears, but no attempt has been made to produce a spring draft gear in which the construction will permit of the lubrication of the various moving parts and the result is that these moving parts, which are subjected to constant and extreme wear when the device is in use, deteriorate rapidly.

My invention resides in the new and novel construction, combination and relation of the various parts hereinafter described and disclosed in the drawing accompanying this specification.

In the drawing:

Fig. 1 is a top plan view of a combined draft gear and coupler head and anchorage shown in partial section.

Fig. 2 is a side view in elevation of a combined coupler head draft gear and anchorage in partial section and shown as secured to the under-sills of a car body.

Fig. 3 is a sectional view taken on the line 3—3 of Fig. 2.

Fig. 4 is a face view of the collars 21 and 24.

In the preferred embodiment of my invention I employ an anchorage casting to be secured to the under-sills 1 of a car body and this anchorage system comprises a rectangular shaped flange 2 which is secured to the sills by means of bolts or rivets 3. Secured to the flange casting by means of the neck member 4 is a ball member 5 provided with a chamber 6 therein. The neck 4 is hollow and has an opening therethrough 7 by means of which oil or other lubricating material may be supplied to the chamber 6.

Mounted upon the ball member 5 is a socket member 8 adapted to fit the ball member 5 and covering substantially one-half of the exterior surface of the ball 5. Cooperating with the socket member 8 is a cap member 9 which also is recessed to fit the outer surface of the ball member 5 and covers about the same amount of surface of the ball as the member 8. The members 8 and 9 are secured together by means of the bolts and nuts 10 which engage with the lugs 11 on the member 8, and 12 on the member 9. The members 8 and 9 are constructed with a lap joint 13 which is made a reasonably tight fit to prevent leakage of the oil which is interposed between the surfaces of the members 5, 8 and 9. The socket member 8 is provided with a stem 14 which projects for a considerable distance from the member 8 and is provided with a central opening 15 which cooperates with an opening 16 in the ball member 5.

The inner end of the stem 14 is counterbored and threaded as shown at 17 and into the threaded counter-bore is threaded a supplementary stem 18 and which is also provided with a threaded end 19. The end of the stem 14 provides a shoulder 20 against which butts a collar 21 slidably mounted upon the supplementary stem 18. To the end 19 of the stem 18 is secured a threaded collar 22 which provides a shoulder 23 and against which butts the collar 24 which is slidably mounted upon the stem 18. Positioned between the collars 21 and 24 is a draft spring 25 which surrounds the stem 18 and which tends to move the collars 21 and 24 against their respective abutments or shoulders 20 and 23 respectively. The spring 25 may be of the ordinary helical coil type or of the friction type or of any other type found suitable for the purpose and of proper capacity. Through the supplementary stem 18 I provide a passage 26 which communicates with the passage 15 in the stem 14. The stems 14 and 18 are prevented from rotating relative to each other by means of the rivets 27 and the collar 22 is prevented from rotating by means of the pin 28.

The coupler head 29 I will not describe in detail as the same is clearly shown and described in my Patent Number 1,094,612, dated April 28, 1914. The detailed construction of the coupler head 29 does not constitute a part of my present invention. The coupler head is mounted at the end of the draft gear housing 30. The draft gear housing comprises a barrel formation 31 having the end opposite to the coupler head 29 internally threaded to receive a threaded bushing 32. The bushing 32 is counter-bored to form a recess therein and within which is placed a yielding packing material 33 which engages and surrounds the stem 14 mounted within the housing 30. A packing gland 34 is provided for adjusting the pressure of the packing 33 with respect to the stem 14 and this adjustment is brought about through the medium of the cap screws 35 which engage lugs 36 on the barrel 31 and lugs 37 on the packing gland 34.

When the stems and draft spring are mounted within the housing in proper relation the collar 21 will butt against the inner end of the bushing 32, which forms the shoulder 38, and the collar 24 will butt against the shoulder 39 formed within the housing 30 due to the forming of the chambers 40 and 41 which are of different diameters.

The assembled device is of such construction that the housing 30 forms a closed receptacle for the stems 14 and 18 and the draft spring 25.

The operation of the device thus far described is believed to be quite unnecessary to any length as the operation will be evident to those skilled in the art. In general when two cars are brought together, equipped with the invention, the impact will move the coupler heads toward their respective anchorages and this in turn will compress the draft spring for the reason that the shoulder 39 will move toward the anchorage and the collar 24 will also move in that direction thereby compressing the draft spring 25 for the reason that the collar 21 butting against the shoulder 20 is immovable. If the direction of movement of the coupler head on two coupled cars should be away from the anchorage then the housing, together with the bushing 32, would move in a direction away from the anchorage and with them would move the collar 21 which butts against the shoulder 38 thereby compressing the spring 25 for the reason that the collar 24 is immovable as it will butt against the shoulder 23 under the operating conditions just described.

I have found that on the ordinary type of draft gears, as already stated, there is a great deal of wear due to the severe operating conditions and this wear extends also to the connection between the draft gear and the anchorage, therefore, I have provided means for lubricating the various moving parts. This I do by filling the chamber 6 within the anchorage member 5 with a lubricating material which may be deposited through the opening 7. It will be evident that if lubricating material is positioned within the chamber 6 to a height corresponding with the opening 16 or higher, that it will flow through the opening 16, the channels 15 and 26 and into the chamber 41 and from there into the chamber 40, and the height of the lubricating material in the chambers 40 and 41 will correspond with the height of the lubricating material in the chamber 6. This lubricating material will tend to maintain the moving parts within the chambers 40 and 41 thoroughly lubricated even though the lubricating material may not entirely fill these chambers for the reason that the material will flow over the surface of the parts through capillary attraction, and the material will also be splashed around within the chambers 40 and 41 due to the motion of the cars and the sudden movements of the draft gear parts.

The packing material 33 forms a very important function besides that of preventing leakage of the lubricating material around the stem 14. It will be noted that the packing material 33 forms a very long bearing and this is purposely so as it forms the main support and guide mechanically between the stem 14 and the housing 30, and the packing material 33 being of a soft and yielding nature such as braided asbestos or hemp, or leather, or other suitable materials, prevents wear between the moving parts and in order to bring the lubricating material within the housing into the contact with the packing material, I may provide one or more transverse channels 42 leading from the channel 15 to the surface of the stem 14 in engagement with the packing 33. It will be evident that there will be less wear to the stem 14 in contact with the packing material 33 than there would be if there was substituted for the packing material a metal surface. If it is desired to fill the receptacles 40 and 41 full of the lubricating material, this is possible from the construction as the passage 7, it will be noted, is above the chamber 40, but if the chambers 40 and 41 are filled with lubricating material there is some possibility of a resistance to the movement of the parts due to the stem being trapped within the chambers 40 and 41 to a considerable extent, therefore, I provide the collars 21 and 24 with transverse slots 43 which permit the collars to move back and forth freely and the oil to pass through the openings 43 so as to relieve any tendency for pressure from the lubricating material, and the passages 15, 16 and 26 from the chamber 41 will also assist in relieving the possibility of pressure.

If desired, the outer surface of the member 5 or the inner surface of the members 8 and 9 may be formed with grooves which communicate with the passage 16 thereby permitting the lubricating material to flow more easily to the surface of these parts most remote from the passage 16. If it is desired to limit the height to which the lubricating material can be placed in the draft gear, then a hole may be provided therein at the height to which the lubricating material is desired and this hole may be placed any place convenient and where it will perform its function, as for instance, the hole 44, and in which there may be placed, if desired, a plug 45 and the hole 44 may be used as a filling hole in place of the passage 7, if desired, by removing the plug 45.

I find that the use of a lubricating material within a draft gear will tend to reduce the resistance of the draft spring 25 as compared with the resistance of the draft spring when used dry, but this difference may be overcome by the employment of a draft spring having a greater resistance to compression and which under dry operating conditions would have a greater strength than required.

I believe that my invention as disclosed offers a new and novel construction and in which many of the difficulties now encountered with draft gears, especially that of wear and tear in the various moving parts, a more quietly working draft gear, which is a valuable feature, especially when used on passenger coaches and one in which the possibility of sticking is eliminated.

It will also be noted that I have provided a substantially universal movement between the draft gear and the anchorage by employing a ball and socket connection between these parts and this is of especial advantage in connection with couplers used upon electrically operated cars which are operated over tracks having sharp curves and also sharp breaks in grade thereby requiring substantially universal movement between the coupler head and the draft gear and the anchorage member, and this universal movement may be found to be of value in connection with steam operated lines or electrified steam roads where the breaks in grade or curves are sharp. The lubricating feature between the moving parts of the ball and socket anchorage is of importance as there is constant movement and wear between these parts under operation and lubrication will substantially eliminate this wear thereby increasing the life of these parts and maintaining a reasonably tight fit which will, therefore, eliminate knocking between these parts with the surging of the cars.

In order to prevent to a large extent leakage of the lubricant around the lap joint 13, I apply a filling material, such as thick white lead, to the surfaces of the joint before assembly.

The threaded connection between the parts 19 and 22 permits one to place any reasonable tension upon the spring 25 desired at the time of assembly and adjustment of such tension after service and providing the spring 25 should take a "set" after service.

The threaded relation of the sleeve 32 and barrel 31 permits taking up any play between the washers 21 and 29 and shoulders 38 and 39 when newly assembling and also permits taking up any lost motion between such parts which may develop after service.

When a friction spring 25 is used the wear and tear upon the spring is great due to the surfaces working together while dry, but when lubricated their life is greater and there is not the tendency to "stick." Such loss of friction as may result from the use of lubrication may be compensated for by the use of a higher capacity spring.

There will be modifications to the disclosure herein made which will be apparent to those skilled in the art, but I do not wish to be limited other than by my claims.

I claim:

1. A draft gear comprising a housing and a stem in telescopic relation, means on the housing and on the stem engaging a spring within the housing to interlock the housing and the stem and yieldingly hold them in a predetermined relation, permitting longitudinal movement of the housing and stem in either direction and simultaneously compressing the spring, means to be secured to a car body and to the stem and permitting universal movement of the stem relative to the car body and a communicating passage through the stem from the last said means to the interior of the housing.

2. A coupler anchorage comprising a supporting member to be attached to a car and having a ball at one end provided with a spherical surface, a socket forming a receptacle with an opening through which passes a neck connecting the support and ball and secured to the ball and arranged to permit freedom of movement of the socket relative to the ball, a housing, a stem projecting from the socket and positioned within the housing, a spring member interlocking the housing and stem to compel compression of the spring when the housing and stem move relative to each other in either of two longitudinal directions and a passage through the stem communicating with the interior of the housing and the interior of the socket.

3. A draft gear comprising a housing, spaced shoulders formed within the housing, a collar engaging each shoulder, a spring interposed between the collars and tending to move them into and normally hold them in engagement with their respective shoulders, a stem mounted within the housing in telescopic relation to the parts, hollow means on the stem to secure the gear to a support, a passage through the stem and communicating with the interior of the hollow means and the housing and shoulders on the stem to alternately engage the collars depending upon the direction of relative movement of the stem and housing and to cause an increased compression upon the spring.

4. A draft gear comprising a housing, spaced shoulders formed within the housing, a stem mounted in telescopic relation to and within the housing and having spaced shoulders thereon conforming substantially with the spaced shoulders on the housing, collars slidably mounted on the stem to engage the shoulders on the housing and on the stem, a draft spring loosely positioned on the stem between the collars and normally holding the collars in engagement with their respective shoulders on the housing and adapted to be further compressed with the relative movement of the housing and the stem in either direction and a yielding material interposed betwen the stem and housing at the outer end of the housing to support the housing on the stem and to prevent wear of the moving parts.

5. A draft gear comprising a housing adapted to contain a lubricating material, spaced shoulders formed within the housing, a stem mounted in telescopic relation to and within the housing and having spaced shoulders thereon conforming substantially with the spaced shoulders on the housing, collars slidably mounted on the stem to engage the shoulders on the housing and on the stem, a draft spring loosely positioned on the stem between the collars and normally holding the collars in engagement with their respective shoulders on the housing and to be further compressed with the relative movement of the housing and the stem in either direction, and a yielding material interposed between the stem and housing at the outer end of the housing to support the housing on the stem and to prevent wear of the moving parts and leakage of the lubricating material.

6. A draft gear comprising a housing, spaced shoulders formed within the housing, a collar engaging each shoulder, a stem mounted in telescopic relation to and within the housing and having spaced shoulders thereon conforming substantially with the spaced shoulders on the housing, collars slidably mounted on the stem to engage the shoulders on the housing and on the stem, a draft spring positioned on the stem between the collars and normally holding the collars in engagement with their respective shoulders on the housing and to be further compressed with the relative movement of the housing and the stem in either direction, an anchorage member to be secured to a car and having a ball terminal with a chamber therein, means on the end of the stem to engage the ball member and permit relative movement in all directions, a passage through the stem communicating with the interior of the housing and a passage in the ball member communicating with the chamber in the ball and with the passage in the stem.

7. A draft gear comprising a housing, closed at one end, spaced shoulders formed within the housing, a collar engaging each shoulder, a spring interposed between the collars and tending to move them into and normally hold them in engagement with their respective shoulders, a stem telescopically mounted in the open end of the housing, a sleeve surrounding the stem and interposed between the stem and housing and one end forming one of the shoulders, means to adjust the sleeve longitudinally of the housing and to hold the sleeve in the adjusted position and packing material interposed between the stem and sleeve to reduce wear of the parts.

8. A draft gear comprising an enclosing member and a telescopic member positioned within the enclosing member for relative longitudinal movement, a spring inter-locking the members in a predetermined position but permitting relative longitudinal movement in either direction, means attached to one of the members to secure the gear to an anchorage, the said means having a spherical surface to engage a spherical surface on the anchorage to permit relative movement between the gear and anchorage in all directions and means of communication between the interior of the enclosing member and the said spherical surfaces to conduct a lubricating material from the interior of the enclosing member to the spherical surfaces.

9. A draft gear comprising an enclosing member, a telescopic member positioned within the enclosing member, means to secure one of the members to an anchorage, a spring within the enclosing member to yieldingly lock and maintain the members in a predetermined position, a receptacle having a communicating passage with the interior of the enclosing member arranged to act as an expansion tank to prevent the pressure of a fluid which may be contained within the enclosing member.

10. A draft gear comprising an enclosing member, a telescopic member positioned within the enclosing member and movable longitudinally thereto in either direction, a single friction spring interlocking the members in a predetermined normal position comprising an inner and an outer helically wound spring and having surfaces which rub together with increasing pressure and friction as the spring is compressed with the movement of the members in either direction and means to lubricate the friction surfaces of the spring.

11. A draft gear comprising an enclosing member, a telescopic member positioned within the enclosing member and movable longitudinally thereto, a spring mounted on the inner or telescopic member and held in position thereon by spaced means on the telescopic member whose distance apart is adjustable, and other spaced means within the enclosing member and whose distance apart is adjustable and engageable by the first spaced means to hold the members normally in a predetermined position.

12. A draft gear comprising an enclosing member, a telescopic member positioned within the enclosing member and movable longitudinally thereto, a spring mounted on the inner or telescopic member and held in position thereon by spaced means on the telescopic member and other spaced means within the enclosing member whose distance apart is adjustable and engageable by the first spaced means to hold the members normally in a predetermined position.

13. A coupler anchorage comprising a plate to be secured to a car body, a projection having an exterior spherical surface, a two-part cap surrounding the projection and having an interior spherical surface to engage that on the projection and also adapted to be attached to a draft gear, a lap joint between the cap parts, means to move the parts into and hold them in engagement with the projection, means between the surfaces of the lap joint to prevent leakage of oil means communicating with the spherical surfaces for supplying a lubricant to the engaging spherical surfaces, a receptacle for oil and means to conduct the oil from the receptacle to the communicating means.

14. A draft gear comprising a pair of telescopic members one member forming an enclosure containing a liquid, yielding means interposed between the members to yieldingly hold them in a predetermined position and means to prevent raising the normal pressure of said liquid when the members move relative to each other in a longitudinal direction.

15. A draft gear comprising a pair of telescopic members movable relative to each other, means on one member to receive a car coupler head, means on the other member to attach to a car anchorage and having a universal movement therewith, yielding means to normally hold the telescopic member in a predetermined relative relation, the car anchorage provided with a chambered spherical member, the second said means comprising an enclosing member having a surface corresponding with and engaging the said spherical surface and means to conduct lubricating material from the said chamber to said spherical surface.

16. A coupler anchorage comprising a plate to secure to a car body, a projection having an exterior spherical surface and a receptacle formed within the projection, communicating means from the receptacle to the exterior surface of the projection, a two-part cap surrounding the projection and having an interior spherical surface to engage that on the projection and also provided with means to attach it to a draft gear, a lap joint between the cap parts and means to move the parts into and hold them in engagement with the projection with the spherical surfaces cooperating.

17. A draft gear comprising a pair of relatively movable telescopic members one of which forms a receptacle for a lubricating material, attaching means to secure the members to a car body, the attaching means having a receptacle for a lubricating material, means on one of the members secured to the attaching means in universal movable relation thereto; spring means to yieldingly hold the members in a predetermined position relative to each other one of the telescopic members provided with a bore forming a conduit between the receptacles to form therewith a lubricating system to supply lubrication to the above relatively movable parts.

18. A draft gear comprising an enclosing member to contain a fluid, a telescopic member positioned within the enclosing member, means to secure one of the members to an anchorage provided with a liquid retaining receptacle and a communicating passage from the receptacle to the engaging surfaces of the anchorage to the said member, means to secure the other member to a coupler head, a single spring within the enclosing member to yieldingly lock and maintain the members in a predetermined position and arranged to be compressed when the telescopic member moves in either direction relative to the enclosing member, a receptacle to act as an expansion tank to prevent pressure of the fluid material within the enclosing member, the telescopic member provided with a passage connecting the receptacle and the enclosing member.

19. A draft gear adapted to be secured to a car body and having universal movement relative thereto comprising an enclosing member, a telescopic member positioned within the enclosing member and movable longitudinally thereto in either direction, a single spring yieldingly interlocking the members in a predetermined normal position and compressible whenever there is longitudinal movement of the members in either direction and acting to return the parts to their normal position, an anchorage secured to the car body and having an enlarged portion with a spherical surface and a cup-shaped enlargement on one end of the telescopic member and having a spherical surface to engage and cooperate with the spherical surface on the anchorage to secure the telescopic member to the anchorage and permit universal movement of the draft gear relative to the anchorage and to the car body.

20. The combination with a car body of an anchorage secured to the body, a hollow projection on the anchorage forming a receptacle for a liquid and having a spherical outer surface, a laterally projecting member having a cup-shaped member at one end with a spherical inner surface coinciding with that on the anchorage to engage and cooperate with said surface on the anchorage to hold the laterally projecting member to said anchorage in universal movable relation thereto, an enclosing member on the laterally projecting member and movable longitudinally thereto in a substantially horizontal direction and means within the enclosing member to yieldingly interlock the enclosing and laterally projecting members together but permit relative longitudinal movement of the said members in either direction.

21. A connection for a car coupler to a car body comprising an anchorage to be secured to a car body, a hollow projection on the anchorage adapted to retain a lubrication and having an outer spherical surface of greater area than that of a semi-sphere, a cup-shaped member having an interior surface conforming to that of the spherical surface on the projection to engage the projection and retain the member in position on the projection and means projecting laterally from the said member and having means securing the said projecting means to a car coupler.

22. A connection for a car coupler to permit universal movement relative to the car body comprising an anchorage with means to secure it to a car body, a projection on the anchorage having a spherical surface and a recess within the projection adapted to retain a liquid lubricant, means of access to the recess and access from the recess to the spherical surface; a cup-shaped member formed in two parts to engage the projection on the anchorage and having surfaces conforming to the spherical surface on the projection; means to hold the two parts in cooperative relation to the projection and means to yieldingly connect the car coupler to the said cup-shaped member.

In testimony whereof I affix my signature.

CHARLES H. TOMLINSON.